United States Patent [19]

Murata

[11] 4,092,572
[45] May 30, 1978

[54] BRUSHLESS D.C. MOTOR DRIVING SYSTEM

[75] Inventor: Motomu Murata, Tokorozawa, Japan

[73] Assignee: Pioneer Electronic Corporation, Tokyo, Japan

[21] Appl. No.: 719,784

[22] Filed: Sep. 2, 1976

[30] Foreign Application Priority Data

Sep. 4, 1975 Japan .............................. 50-107382

[51] Int. Cl.² ............................................ H02K 29/00
[52] U.S. Cl. ...................................... 318/138; 318/254
[58] Field of Search ................ 318/138, 254; 235/193; 323/18, 19

[56] References Cited

U.S. PATENT DOCUMENTS

| | | | |
|---|---|---|---|
| 4,005,347 | 1/1977 | Erdman | 318/138 |
| 4,027,212 | 5/1977 | Studer | 318/138 |

*Primary Examiner*—Gene Z. Rubinson
*Attorney, Agent, or Firm*—Sughrue, Rothwell, Mion, Zinn and Macpeak

[57] ABSTRACT

A stator winding drive circuit for a brushless d.c. motor having a permanent magnet rotor and a plurality of stator poles unequal to the number of rotor poles. Hall elements sense the rotor position, but due to the unequal number of rotor and stator poles, if the amplified Hall element outputs are used to directly drive the stator windings some drive signal overlap will exist resulting in torque ripple. Therefore, the true and reciprocal Hall element outputs are applied to a resistive addition network to produce staircase waveforms, portions of which have the desired sequential timings and non-overlapping electrical durations. These waveforms are applied to threshold switching circuits triggered by such desired portions, and the switching circuit outputs feed the stator windings.

4 Claims, 9 Drawing Figures

BRUSHLESS D.C. MOTOR DRIVING SYSTEM

BACKGROUND OF THE INVENTION

This invention relates to a current driving system for the stator windings of a direct current brushless motor in which magneto-electrical conversion elements, an addition network and a switching circuit are employed instead of the conventional brush and commutator, and wherein sequential currents having predetermined, non-overlapping flow angles are applied to the stator windings in response to an angular rotor position detections.

In a direct drive phonographic turntable system wherein the drive motor necessarily at very low r.p.m.'s, i.e. 33 or 45, exceptionally smooth and flat speed and torque curves are essential. Brushless d.c. motors having permanent magnet rotors are well adapted to this purpose, and typically the number of rotor and stator poles are unequal to product smoother speed and torque curves. This creates problems, however, in designing circuitry to drive the stator windings too produce such smooth operation.

Where Hall effect devices are employed as angular rotor position detection elements they are spaced at predetermined intervals around the periphery of the stator. Such Hall elements are often not uniform in sensitivity, however, and thus produce unbalanced voltages and non-analogous outputs. In order to supply smooth and balanced currents having predetermined phase differences to the stator windings, the Hall element outputs are typically shaped into rectangular waveforms by differential amplifiers. The outputs of the differential amplifiers have flow angles of 180 electrical degrees with respect to the rotor, however, while flow-angles having shorter durations are needed to drive the stator windings owing to the unequal number of rotor and stator poles. If the stator windings are driven at flow angles of 180° with respect to the rotor, the drive currents flowing in such stator windings are overlapped. This reduces the efficiency of the motor and increases the torque ripple, as contrasted to the smoother operation which results when the stator windings are driven by non-overlapping currents having shorter flow angles (120° or 60°).

SUMMARY OF THE INVENTION

According to this invention, the true and reciprocal or inverted differential amplifier outputs, obtained in response to angular rotor position detection signals, are applied to a resistive addition network. The network outputs are staircase signals, the upper portions of which have the sequential phase relationships and non-overlapping durations desired for the stator winding drive signals. To effectively extract only such upper waveform portions, the network outputs are applied to a threshold switching circuit whose triggering level is set just below the amplitude level of the upper waveform portions. The switching circuit outputs feed the stator windings. The result is that, in effect, overlapping rotor position detection signals having undesirably long durations are converted to sequential, nonoverlapping, stator winding drive signals having shorter durations, to thereby improve the motor effeciency and reduce torque ripple.

DETAILED DESCRIPTION OF THE INVENTION

Figure 1:
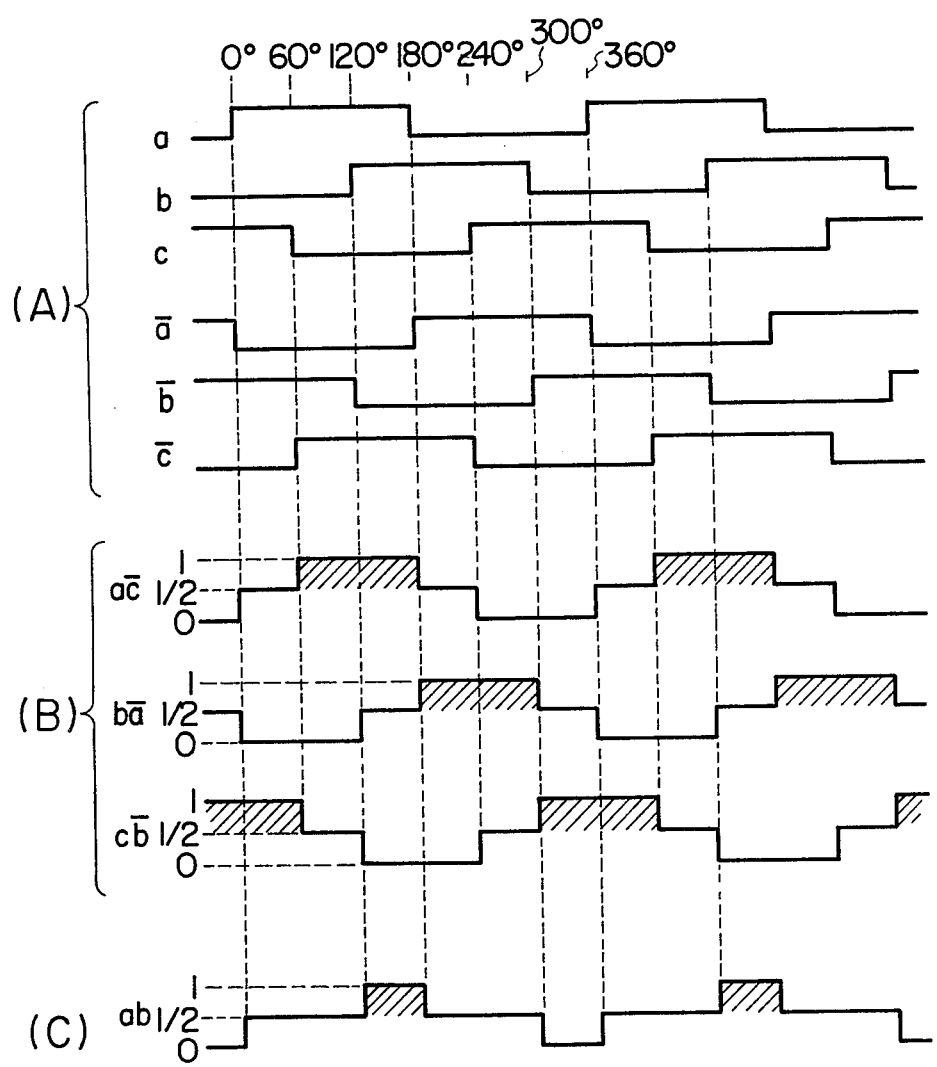
FIGS. 1A–1C are waveform diagrams showing some of the input and output signals involved in this invention.

The general principles of a direct current brushless motor drive system according to this invention will initially be described, with reference to the waveform diagrams of FIGS. 1A-1C.

FIG. 1A shows three equally displaced, rectangular waveforms $a$, $b$ and $c$ produced from the outputs of spaced rotor position detectors, and three opposite phase or reciprocal rectangular waveforms, $\bar{a}$, $\bar{b}$ and $\bar{c}$, respectively. The latter may be produced by differential amplifiers, inverters, or the like concurrently with the generation of waveforms $a$, $b$ and $c$.

The addition of waveforms $a$ and $\bar{c}$ produces a waveform $a\bar{c}$ as shown in FIG. 1B, whose amplitude level is one-halve in the range from 0° to 60°, 1 in the range from 60° to 180°, ½ in the range from 180° to 240°, and 0 in the range from 240° to 360°. Accordingly,, if the waveform $a\bar{c}$ is applied to the input of a switching circuit whose conduction or threshold level is set between ½ and 1, the output of the switching circuit will be raised for or have a flow angle of 120 degrees. In a similar manner, outputs having phase displaced but equal flow angles of 120° can be obtained from the waveforms $b\bar{a}$ and $c\bar{b}$, respectively.

If waveform $a$ is added to waveform $b$, the result is a waveform $ab$ as shown in FIG. 1C. If this waveform $ab$ is applied to a threshold switching circuit similar to that described above, an output signal having a flow angle or duration of 60° can be obtained therefrom. Similarly, outputs having phase displaced but equal flow angles of 60° can be obtained from the addition and thresholding of waveforms $b$ and $c$, $a$ and $c$, $\bar{a}$ and $\bar{c}$, $a$ and $\bar{b}$, and $\bar{c}$ and $\bar{b}$, respectively.

As is apparent from the foregoing, if the six rotor position detector outputs (the three phase-overlapping waveforms $a$, $b$ and $c$ in FIG. 1A and their reciprocals $\bar{a}$, $\bar{b}$ and $\bar{c}$) are added in various combinations and then applied to a suitable switching circuit having an appropriate threshold level, stator winding currents having desired flow angles or durations and properly timed, sequential, non-overlapping phases can be produced. As a result, the motor efficiency can be improved and the torque ripple can be greatly reduced.

Although the foregoing description is with reference to the development of three-phase signals with sequential flow angles of 60°, six-phase signals having flow angles of 120° degrees can also be obtained in a method similar to the above. Furthermore, twelve-phase signals having flow angles of 30° can be obtained if additional rotor position detectors are employed, or their relative spacings are changed. That is, output signals having flow angles coincident with the phase difference of the outputs of the rotor position detectors can always be obtained with appropriate signal processing.

Figure 2:
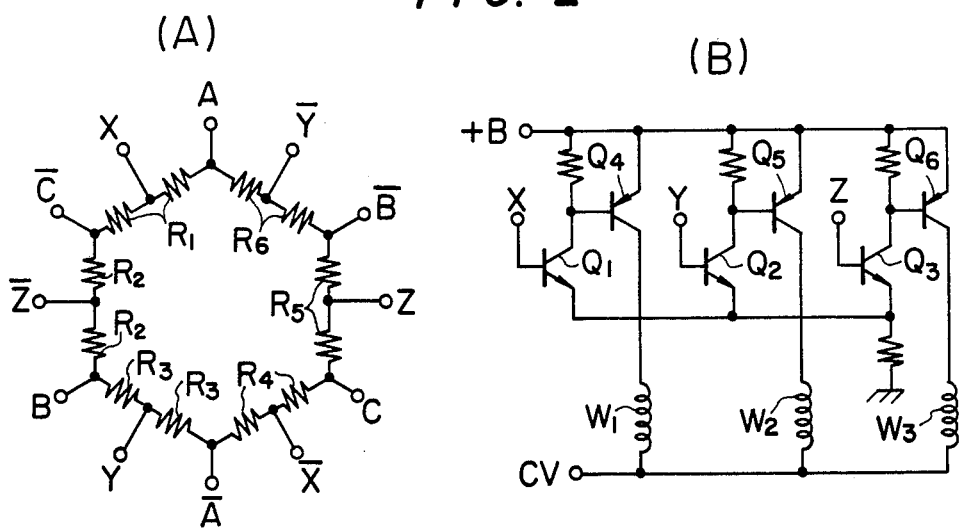
FIGS. 2A and 2B are schematic circuit diagrams illustrating one embodiment of a direct current brushless motor driving system according to this invention.

FIG. 2 shows one embodiment of a direct current brushless motor drive system according to this invention, and employing the signal processing concepts developed above. An addition circuit or adder for providing six-phase outputs having flow angles of 120° is shown in FIG. 2A. In this adder, signals having position detection waveforms as shown in FIG. 1A are applied respectively to terminals A, B, C, $\overline{A}$, $\overline{B}$, and $\overline{C}$. Pairs of equal valued resistors R1, R1; R2, R2; R3, R3; R4, R4; R5, R5; and R6, R6 are connected in series between terminals A and $\overline{C}$, $\overline{C}$ and B, B and $\overline{A}$, $\overline{A}$ and C, C and $\overline{B}$, and B and A, respectively. Output terminals X, $\overline{Z}$, Y, $\overline{X}$, Z and $\overline{Y}$, are taken from the connection or mid points of these resistor pairs, respectively. With this arrangement of the waveforms shown in FIG. 1B appear at output terminals X, Y and Z, respectively, while waveforms of opposite phase appear at output terminals $\overline{X}$, $\overline{Y}$ and $\overline{Z}$. In drive systems where only waveforms X, Y and Z are needed, the resistor pairs R2, R4 and R6 may be omitted.

FIG. 2B shows a threshold switching circuit to which the outputs appearing at terminals X, Y and Z of FIG. 2A are applied as inputs, to thereby produce non-overlapping stator winding currents for a direct current brushless motor having flow angles of 120°. In this circuit transistors Q1, Q2 and Q3 act as threshold switches, and the signals taken from terminals X, Y and Z in FIG. 2A are applied to the bases of the transistors, respectively. During the periods of time when transistors Q1, Q2 and Q3 are conductive, sequential currents having flow angles or durations of 120° are supplied to the stator windings W1, W2 and W3 of the motor through driving transistors Q4, Q5, and Q6, respectively. A control voltage CV is applied to the common terminal of the windings W1, W2 and W3 to regulate the speed of the motor.

With the addition and switching circuits of FIG. 2 arranged as shown, although the voltage waveforms applied to transistors Q1, Q2, and Q3 have three levels (1, ½ and 0) as shown in FIG. 1B, the transistors are rendered conductive only during those periods of time when their input signals have amplitude levels greater than 178, and accordingly the currents flowing in the stator windings W1, W2 and W3 have non-overlapping flow angles of 120°.

Figure 3:
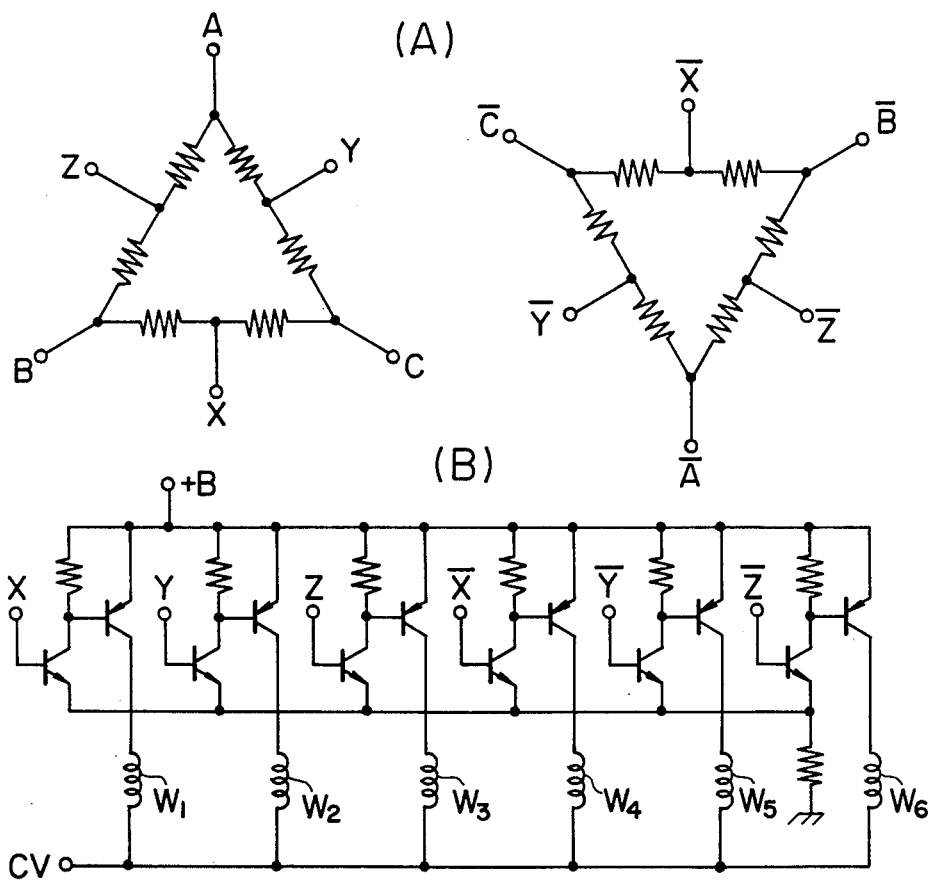
FIGS. 3A and 3B are schematic circuit diagrams showing another embodiment of a driving system according to the invention.

In the embodiment of the invention shown in FIG. 3, six sequential, non-overlapping outputs having flow angles of 60 degrees are provided. FIG. 3A shows a pair of delta addition circuits so designed that, similar to FIG. 2A, when signals having waveforms as shown in FIG. 1A are applied to input terminals A, B, C, $\overline{A}$, $\overline{B}$ and $\overline{C}$, respectively, switching signals having sequential, non-overlapping, 60 degree waveforms as shown in FIG. 1C are obtained at output terminals X, Y, Z, $\overline{X}$, $\overline{Y}$ and $\overline{Z}$. A threshold switching cicuit for this embodiment is shown in FIG. 3B which, similar to the switching circuit of FIG. 2B, supplies stator currents for windings W1-W6 having flow angles of 60° and no phase ovelap.

Figure 4:
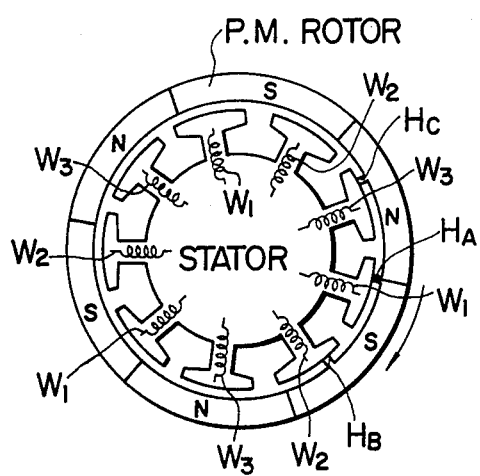
FIG. 4 shows the general arrangement of the rotor and stator poles and Hall element sensors for a brushless d.c. motor employing the circuitry of FIG. 2.

FIG. 4 shows the general arrangment of a brushless d.c. motor capable of being driven by the circuitry of FIG. 2. As may be seen, the stator in this embodiment has nine poles whereby each of the windings W1-W3 in FIG. 2B actually comprises three separate windings connected in series. The permanent magnet rotor has six poles, surrounds the stator, and has the form of a hollow cylinder. The three Hall element sensors $H_A$, $H_B$ and $H_C$ are shown mounted in spaced relationship around the periphery of the stator in close proximity to the rotor, to thereby maximize their output signals. The smoothness of operation of the motor can easily be visualized from FIG. 4, wherein it is seen that similar stator poles having the same windings and therefore energized at the same time, occupy slightly different positions with respect to the adjacent rotor poles. FIG. 4 is presented by way of example only to facilitate a better understanding of the invention, and many other rotor and stator constructions are possible within the scope of the invention.

Figure 5:
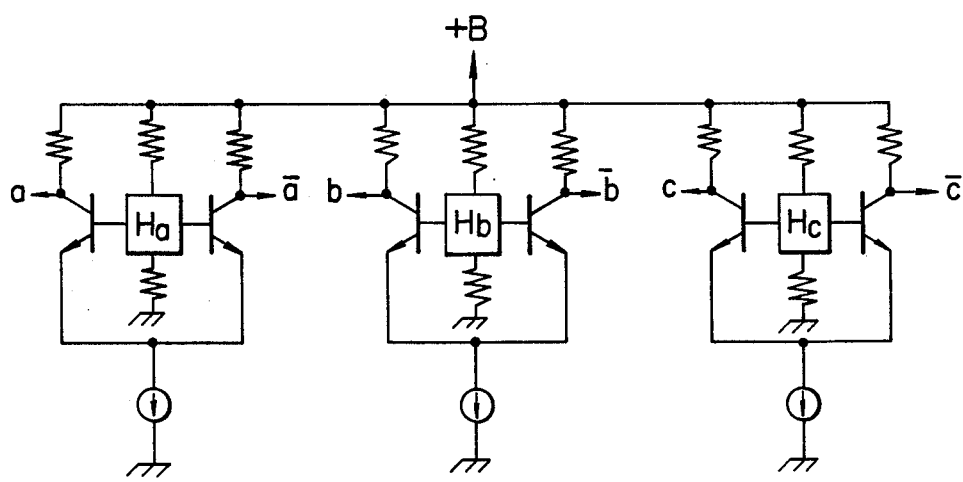
FIG. 5 shows a schematic circuit diagram of the Hall elements and their associated differential amplifiers.

FIG. 5 shows a schematic circuit diagram of the Hall elements $H_A$, $H_B$ and $H_C$ and their associated differential amplifiers. The outputs $a$, $\overline{a}$, $b$, $\overline{b}$, $c$ and $\overline{c}$ are connected to the correspondingly designated terminals in the resistive addition networks of FIGS. 2A or 3A. The emitter terminals are grounded through constant voltage devices, such as Zener diodes.

What is claimed is:

1. In a brushlesss direct current motor including a permanent magnet rotor having a plurality of poles, an electromagnet stator having a plurality of poles unequal to the number of rotor poles, and a plurality of angular rotor position sensing means spaced around the periphery of the stator and producing overlapping, phase displaced, rectangular waveforms, and reciprocal waveforms thereof, each waveform having an on-time duration or flow angle of 180 electrical ° with respect to the rotor, an improved stator winding drive circuit comprising:
   (a) a resistive addition network responsive to the sensing means waveforms for producing a plurality of staircase signals, the upper portions of which have sequential, consecutive, non-overlapping flow angles,
   (b) a plurality of stator windings, and
   (c) a threshold switching circuit responsive to the staircase signals and conductive only during the upper portions thereof for supplying the stator windings with sequential, consecutive, non-overlapping drive currents, whereby the motor efficiency is improved and torque ripple is reduced,
   wherein the addition network comprises a plurality of series connected, equal valued resistor pairs, two sensing means waveforms are coupled to the ends of each pair, and a staircase signal is taken from the junction of each pair.

2. A stator winding drive circuit as defined in claim 1 wherein the threshold switching circuit comprises a plurality of transistor pairs, each pair comprising a first, threshold switching transistor having its base terminal connected to a staircase signal and its collector terminal connected to the base terminal of a second, drive transistor, and wherein the collector terminal of each drive transistor is connected to a stator winding.

3. A stator winding drive circuit as defined in claim 1 wherein each rotor position sensing means comprises a Hall element having two output terminals respectively coupled to the input terminals of a differential amplifier.

4. A stator winding drive circuit as defined in claim 1 wherein the rotor has six poles, the stator has nine poles, each stator winding comprises three series connected individual windings, there are three rotor position sensing means, and the upper portion of each staircase signal has a flow angle of 120 electrical ° with respect to the rotor.

* * * * *